United States Patent
Karp et al.

(10) Patent No.: US 8,171,266 B2
(45) Date of Patent: May 1, 2012

(54) LOOK-AHEAD LOAD PRE-FETCH IN A PROCESSOR

(75) Inventors: Alan H. Karp, Palo Alto, CA (US); Rajiv Gupta, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2642 days.

(21) Appl. No.: 09/922,551

(22) Filed: Aug. 2, 2001

(65) Prior Publication Data

US 2003/0046518 A1 Mar. 6, 2003

(51) Int. Cl.
*G06F 12/00* (2006.01)
(52) U.S. Cl. ........................... 712/225; 711/137
(58) Field of Classification Search ............... 712/225, 712/219
See application file for complete search history.

(56) References Cited

U.S. PATENT DOCUMENTS 5,377,336 A * 12/1994 Eickemeyer et al. ......... 712/207
6,131,145 A * 10/2000 Matsubara et al. ........... 711/137
6,363,475 B1 * 3/2002 Dowling ....................... 712/206
6,584,549 B2 * 6/2003 Abdallah et al. .............. 711/137
6,636,945 B2 * 10/2003 Nakamura ..................... 711/137

OTHER PUBLICATIONS

Klaiber, A.C., etal., An Architecture for Software-Controller Data Prefetching, 1991, ACM pp. 43-53.*
Chen, Tien-Fu, etal., Effective Hardware-Based Data Prefetching for High-Performance Processors,1995, IEEE, pp. 609-623.*

* cited by examiner

*Primary Examiner* — Eric Coleman

(57) ABSTRACT

A method for look-ahead load pre-fetching that reduces the effects of instruction stalls caused by high latency instructions. Look-ahead load pre-fetching is accomplished by searching an instruction stream for load memory instructions while the instruction stream is stalled waiting for completion of a previous instruction in the instruction stream. A pre-fetch operation is issued for each load memory instruction found. The pre-fetch operations cause data for the corresponding load memory instructions to be copied to a cache, thereby avoiding long latencies in the subsequent execution of the load memory instructions.

17 Claims, 5 Drawing Sheets

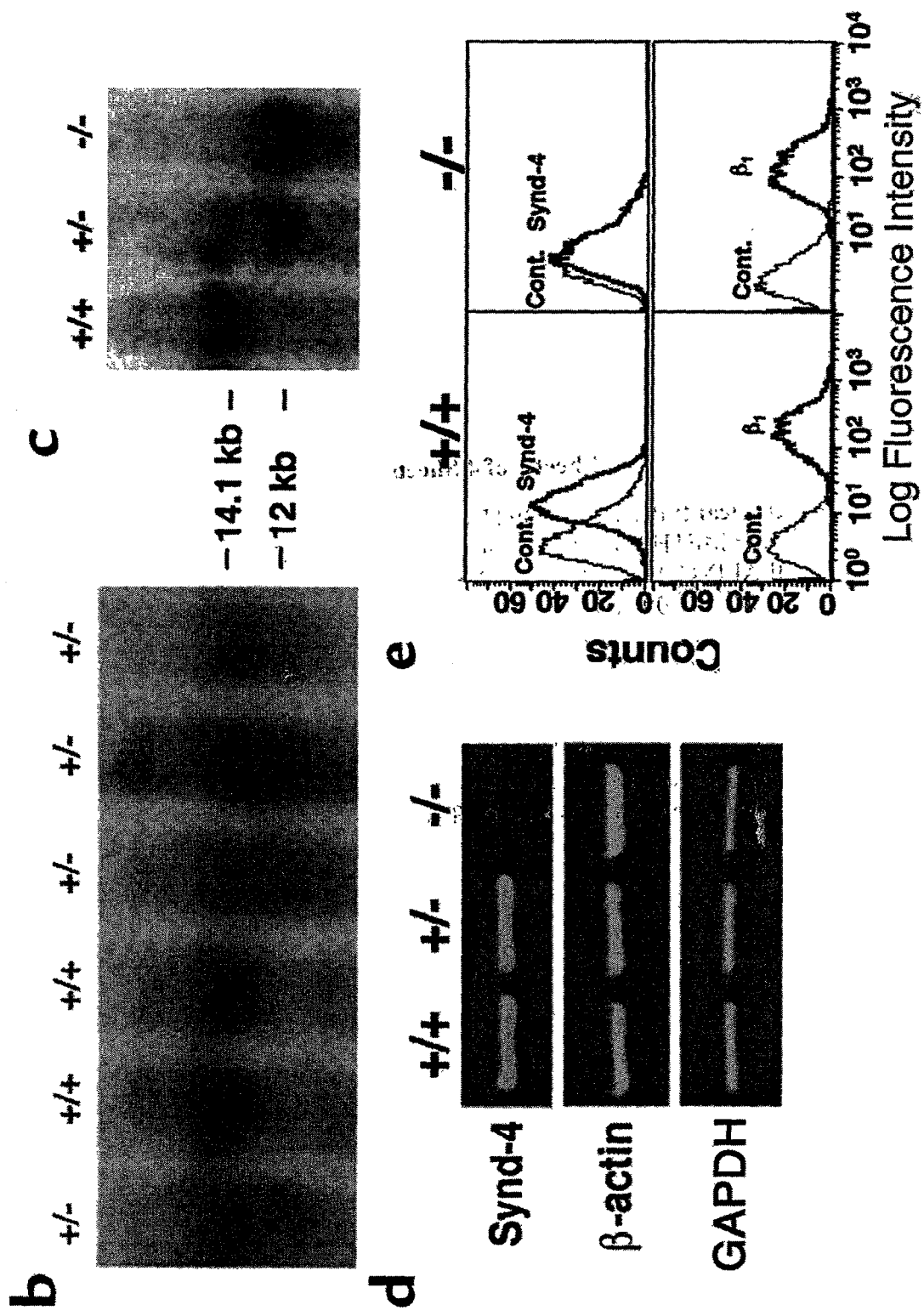
Figure 1b-d

US 8,171,266 B2

LOOK-AHEAD LOAD PRE-FETCH IN A PROCESSOR

BACKGROUND OF THE INVENTION

1. Field of Invention

The present invention pertains to the field of processors. More particularly, this invention relates to instruction execution in a processor.

2. Art Background

A computer system usually includes one or more processors which execute instructions. A processor may also be referred to as a central processing unit. A typical processor fetches a stream of instructions from a memory and executes each instruction in the instruction stream.

Typically, the instructions in an instruction stream have dependencies with respect to one another. For example, it is common for an instruction in the instruction stream to use the results of one or more previous instructions in the instruction stream. It is therefore common for a processor to stall instruction execution whenever the result of a previous instruction is not available for use by a subsequent instruction that requires the result.

Some instructions can cause a processor to stall instruction execution for a relatively long time. Such instructions may be referred to as high latency instructions. Unfortunately, the relatively long duration stalls caused by high latency instructions can greatly diminish the overall instruction execution performance of a processor.

SUMMARY OF THE INVENTION

A method is disclosed for look-ahead load pre-fetching that reduces the effects of instruction stalls caused by high latency instructions. Look-ahead load pre-fetching is accomplished by searching an instruction stream for load memory instructions while the instruction stream is stalled waiting for completion of a previous instruction in the instruction stream. A pre-fetch operation is issued for each load memory instruction found. The pre-fetch operations cause data for the corresponding load memory instructions to be copied to a cache, thereby avoiding long latencies in the subsequent execution of the load memory instructions.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1A:
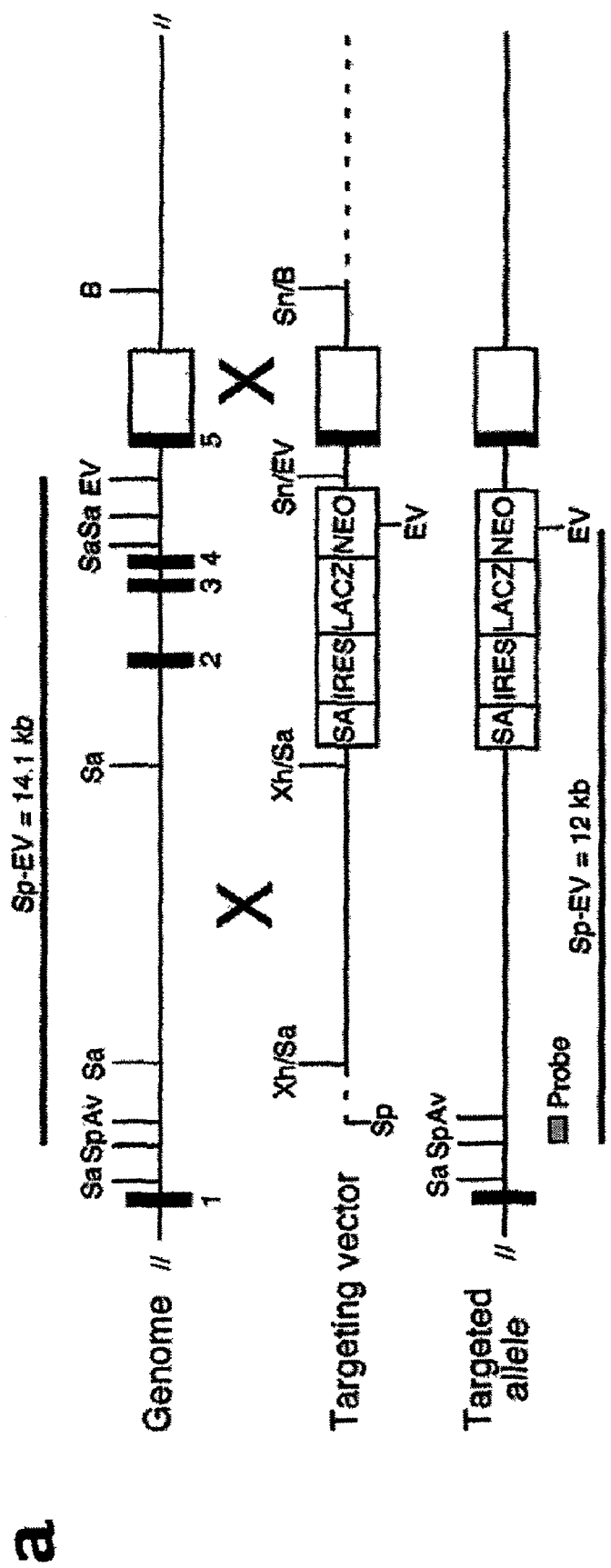
FIG. 1 shows a processor which performs look-ahead load pre-fetching according to the present teachings.

FIG. 1 shows a processor 10 which performs look-ahead load pre-fetching according to the present teachings. The processor 10 obtains an instruction stream 16 and executes each instruction in the instruction stream 16 including a sequence of instructions $I_n$ through $I_{n+x}$.

The execution of the instruction $I_n$ causes the processor 10 to stall execution of the instruction stream 16 while waiting for completion of the instruction $I_n$. The processor 10 looks ahead through the instructions $I_{n+1}$ through $I_{n+x}$ during the instruction stall searching for load memory instructions. The processor 10 issues pre-fetch operations for any found load memory instructions that are ready for execution. The pre-fetch operations cause data for the corresponding load memory instructions to be copied from a main memory 14 into a cache 12 via a bus 18.

The look-ahead load pre-fetching taught herein reduces the instruction stall intervals that would otherwise occur during execution of the load memory instructions for which pre-fetch operations were issued because the data for those load memory instructions will be available in the cache 12, thereby avoiding long latency accesses to the main memory 14.

In one embodiment, the processor 10 is an in-order processor. The techniques disclosed herein are nevertheless applicable to an out-of-order processor which suffers significantly long instruction stalls.

The processor 10 may obtain the instruction stream 16 from an instruction cache which obtains the instructions from the main memory 14. The instruction cache may be integrated into the processor 10 or may be separate from the processor 10.

In some embodiments, a pre-fetch operation may copy the memory data into a data cache that is integrated into the processor 10.

Figure 2:
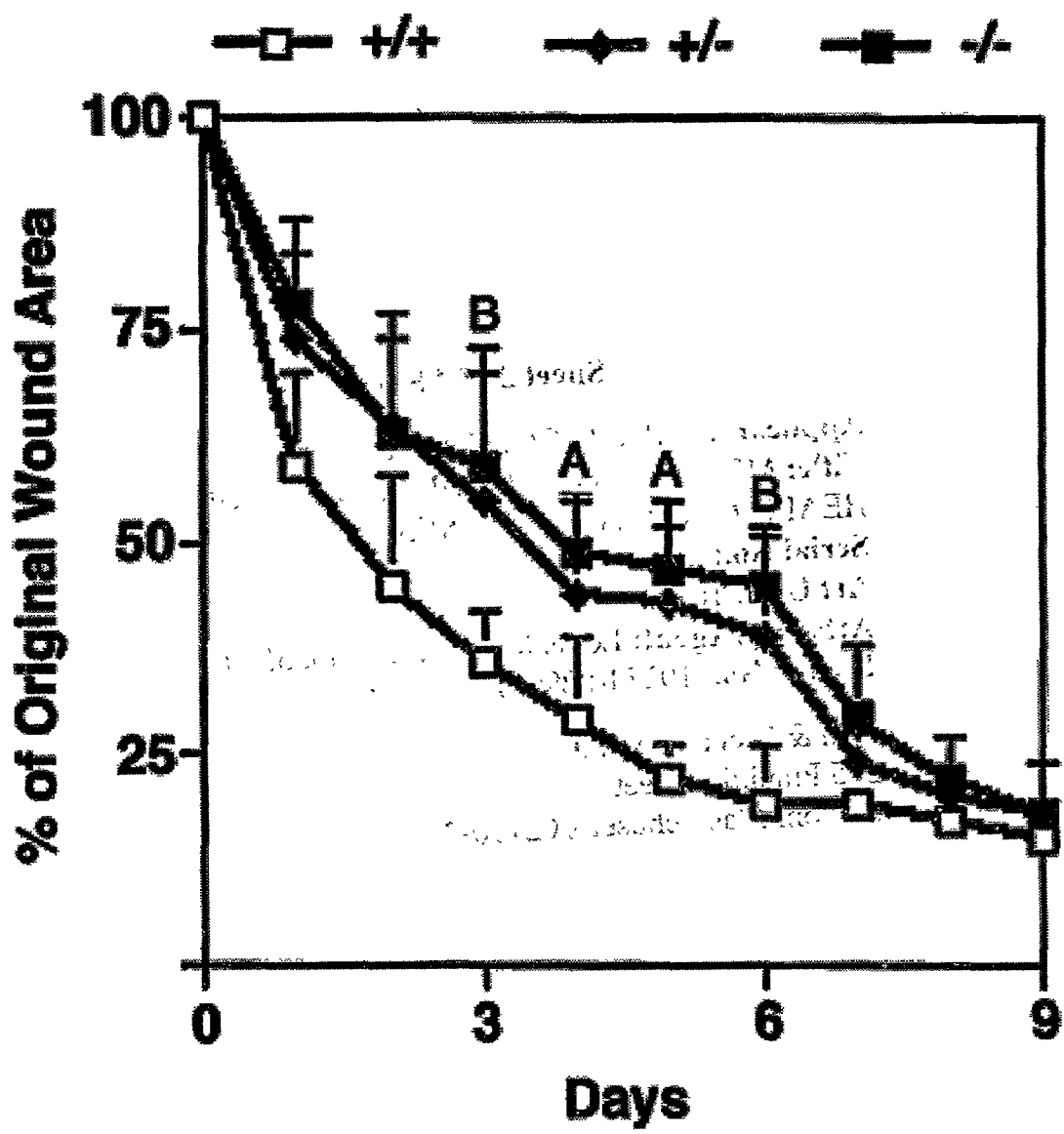
FIG. 2 shows a method for look-ahead load pre-fetching according to the present teachings.

FIG. 2 shows a method for look-ahead load pre-fetching according to the present teachings. The method steps shown are performed by the processor 10 during an instruction stall. In the following example, the processor 10 performs the look-ahead load pre-fetching steps when stalled during execution of the instruction $I_n$ which is a load memory instruction. The load memory instruction $I_n$ causes a relatively long latency instruction stall when the data targeted by the load memory instruction $I_n$ is not contained in the cache 12 and must be obtained from the main memory 14.

At step 100, the processor 10 searches the instructions $I_{n+1}$ through $I_{n+x}$ looking for load memory instructions in the instruction stream 16. At step 102, if a load memory instruction is not found in the instructions $I_{n+1}$ through $I_{n+x}$ then the processor 10 continues with the instruction stall at step 110.

The number x of instructions searched at step 100 depends on the implementation of the processor 10 hardware. In some embodiments, the number x is the number of instructions held in an instruction execution pipeline in the processor 10. In some embodiments, the processor 10 may continue the search into an instruction cache.

At step 102, if a load memory instruction is found in the instructions $I_{n+1}$ through $I_{n+x}$ then at step 104 the processor 10 determines whether the memory address for the found load memory instruction has been resolved. If for example the instruction $I_{n+3}$ is a load memory instruction and the memory address it uses is provided by the result of one of the uncompleted instructions $I_{n+2}$ through $I_n$ then the memory address is not resolved. On the other hand, if the instruction $I_{n+3}$ is a load memory instruction and the memory address it uses does not depend on the completion of instructions $I_{n+2}$ through $I_n$ then the memory address is resolved.

The determination at step 104 may be rendered in any known manner. For example, the instruction $I_{n+3}$ may be a load memory instruction such as LD R1,R2 which specifies a load of the data stored at a memory address contained in register R1 into the register R2. The processor 10 may examine the uncompleted instructions $I_{n+2}$ through $I_n$ for any uncompleted instructions which write results into the register R1. The processor 10 may use a decode unit to examine the instructions $I_{n+2}$ through $I_n$ or may have a mechanism for indicating which registers in the processor 10 are unresolved.

If the memory address is not resolved at step 104, then at step 108 the processor 10 determines whether there are more of the instructions $I_{n+1}$ through $I_{n+x}$ to search for load memory instructions. If there are more instructions then they are searched at step 100. Otherwise, the processor 10 continues with the instruction stall at step 110.

If the memory address is resolved then at step 106 the processor 10 issues a pre-fetch operation using the memory address specified in the load memory instruction found at step 100. The pre-fetch operation causes the data corresponding to the memory address of the found load instruction to be fetched from the main memory 14 and placed in the cache 12. Thereafter at step 108, the processor 10 determines whether there are more of the instructions $I_{n+1}$ through $I_{n+x}$ to search for load memory instructions.

Figure 3:
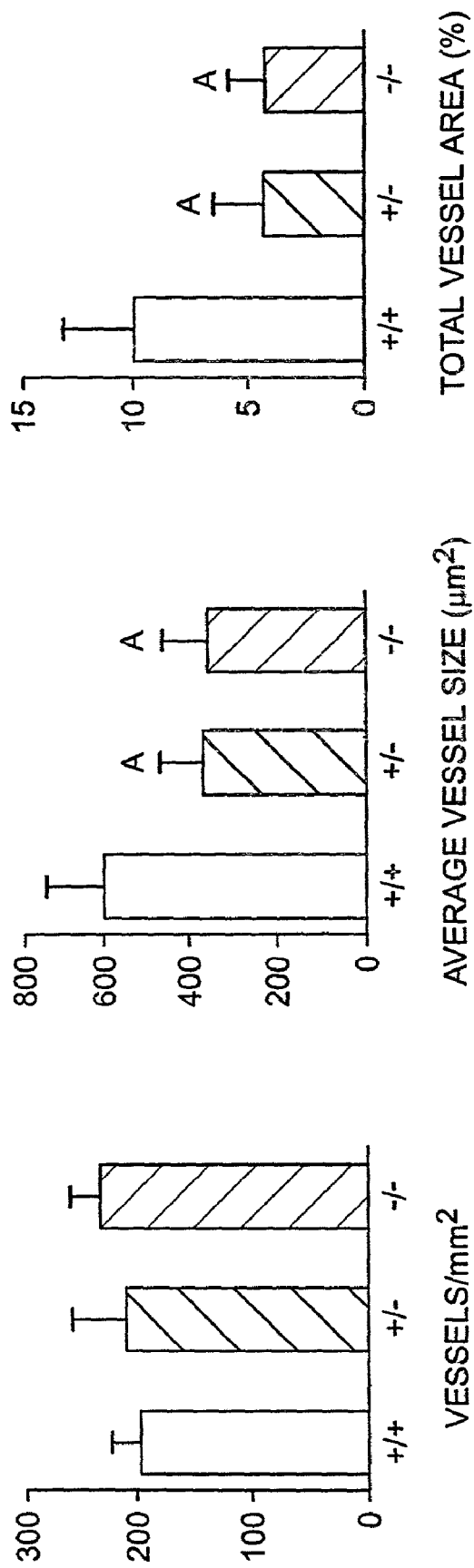
FIG. 3 shows the timing of example look-ahead load pre-fetch operations by a processor.

FIG. 3 shows the timing of example look-ahead load pre-fetch operations by the processor 10. The timing shown is referenced to cycles of the processor 10. One cycle of the processor 10 for the following illustration may be defined as the time taken in the processor 10 to perform an integer add operation.

The instruction stall on the load memory instruction $I_n$ starts at cycle m and ends at cycle m+25. This is only an example of the latency (25 processor cycles) for a load memory instruction that goes out to the main memory 14. The latency of a load memory instruction may vary among processor designs. In addition, the latency may vary among load memory instructions executing on the processor 10 depending on other activities that occur on the bus 18.

Between cycle m and cycle m+5 the processor 10 searches for and finds the load memory instruction $I_{n+3}$ and issues a corresponding pre-fetch operation at cycle m+5. Between cycle m+5 and cycle m+9 the processor 10 searches for and finds the load memory instruction $I_{n+5}$ and issues a corresponding pre-fetch operation at cycle m+9.

The load memory instruction $I_n$ completes at cycle m+25 and the processor 10 resumes execution of the instruction stream 16 thereafter. The pre-fetch operation for the load memory instruction $I_{n+3}$ completes at cycle m+29 and the pre-fetch operation for the load memory instruction $I_{n+5}$ completes at cycle m+32. As a consequence, the data for the load memory instruction $I_{n+3}$ is available in the cache 12 starting at cycle m+29 and the data for the load memory instruction $I_{n+3}$ is available in the cache 12 starting at cycle m+32. This avoids long instruction stalls during execution of the load memory instructions $I_{n+3}$ and $I_{n+5}$ such as the stall that occurred with the load instruction $I_n$.

Figure 4:
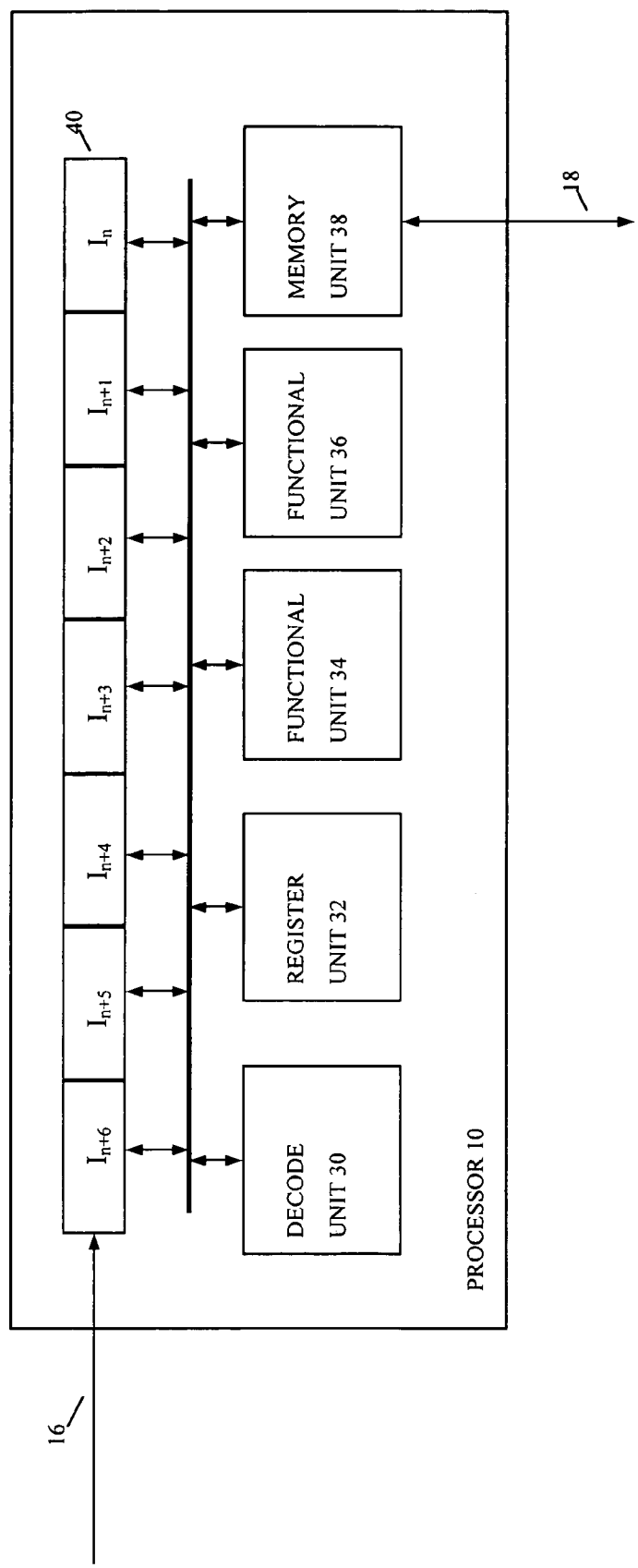
FIG. 4 shows the instruction execution elements in a processor in one embodiment.

FIG. 4 shows the instruction execution elements in the processor 10 in one embodiment. The processor 10 in this embodiment includes an instruction pipeline 40 that holds the instructions $I_n$ through $I_{n+6}$ in corresponding stages of instruction execution.

The processor 10 includes a set of functional units 30-38 which perform hardware operations associated with instruction execution. For example, the decode unit 30 perform instruction decode operations, the register unit 32 performs register operations, and the memory unit 38 performs load memory an pre-fetch operations. Other examples of functional units include math units, branch units, memory store units, etc.

In this example, the load memory instruction $I_n$ is in the last stage of the instruction pipeline 40 after the memory address for the load memory instruction $I_n$ has been copied to the memory unit 38. At cycle m, the memory unit 38 signals a stall until the data for the load memory instruction $I_n$ is obtained from the main memory 14 via the bus 18.

Upon detection of the stall signal from the memory unit 38, the decode unit 30 searches the remaining stages of the instruction pipeline 40, from last to first, looking for a load memory instruction with a resolved address. The decode unit 30 then initiates a pre-fetch operation for the found load memory instruction by writing the memory address for the found load memory instruction to the memory unit 38 and providing the memory unit 38 with a signal to perform a pre-fetch operation. The memory unit 38 then performs a pre-fetch operation via the bus 18 to read the data from the main memory 14 and copy it to the cache 12.

Alternatively, one of the other functional units may perform the search and generate pre-fetch operations.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for look-ahead load pre-fetch, comprising the steps of:
    searching an instruction stream sequentially per instruction to find a load memory instruction in response to the instruction stream being stalled while waiting for completion of a previous instruction in the instruction stream;
    issuing a pre-fetch operation to fetch the load memory instruction.

2. The method of claim 1, wherein the previous instruction is a previous load memory instruction.

3. The method of claim 1, wherein the step of issuing comprises the step of issuing the pre-fetch operation if a memory address for the load memory instruction is resolved and not otherwise.

4. The method of claim 1, wherein the step of issuing the pre-fetch operation comprises the step of issuing the pre-fetch operation while the instruction stream is stalled on the previous instruction.

5. The method of claim 1, wherein the pre-fetch operation reads a set of data from a main memory and stores the data in a cache.

6. The method of claim 1, further comprising the steps of searching the instruction stream for a set of additional load memory instructions and issuing a pre-fetch operation for each additional load memory instruction having a memory address which is resolved while the instruction stream is stalled.

7. An apparatus for look-ahead load pre-fetch, comprising:
    means for searching an instruction stream sequentially per instruction to find a load memory instruction in response to the instruction stream being stalled while waiting for completion of a previous instruction in the instruction stream;
    means for issuing a pre-fetch operation to fetch the load memory instruction.

8. The apparatus of claim 7, wherein the previous instruction is a previous load memory instruction.

9. The apparatus of claim 7, wherein the means for issuing comprises means for issuing the pre-fetch operation if a memory address for the load memory instruction is resolved and not otherwise.

10. The apparatus of claim 7, wherein the means for issuing the pre-fetch operation comprises means for issuing the pre-fetch operation while the instruction stream is stalled on the previous instruction.

11. The apparatus of claim 7, wherein the pre-fetch operation reads a set of data from a main memory and stores the data in a cache.

12. The apparatus of claim 7, further comprising means for searching the instruction stream for a set of additional load memory instructions and means for issuing a pre-fetch operation for each additional load memory instruction having a memory address which is resolved while the instruction stream is stalled.

13. A processor, comprising:
- a instruction pipeline for executing an instruction stream;
- means for searching the instruction pipeline sequentially per instruction to find a load memory instruction in response to the instruction pipeline being stalled while waiting for completion of a previous instruction in the instruction stream;
- a functional unit that issues a pre-fetch operation to fetch the load memory instruction.

14. The processor of claim 13, wherein the instruction pipeline searches the instruction pipeline during a stall on a load memory instruction in the instruction stream.

15. The processor of claim 13, wherein the functional unit issues the pre-fetch operation if a memory address for the load memory instruction is resolved and not otherwise.

16. The processor of claim 13, wherein the functional unit issues the pre-fetch operation while the instruction stream is stalled.

17. The processor of claim 13, further comprising a cache such that the pre-fetch operation reads a set of data from a main memory and stores the data in the cache.

* * * * *